Figure 1:
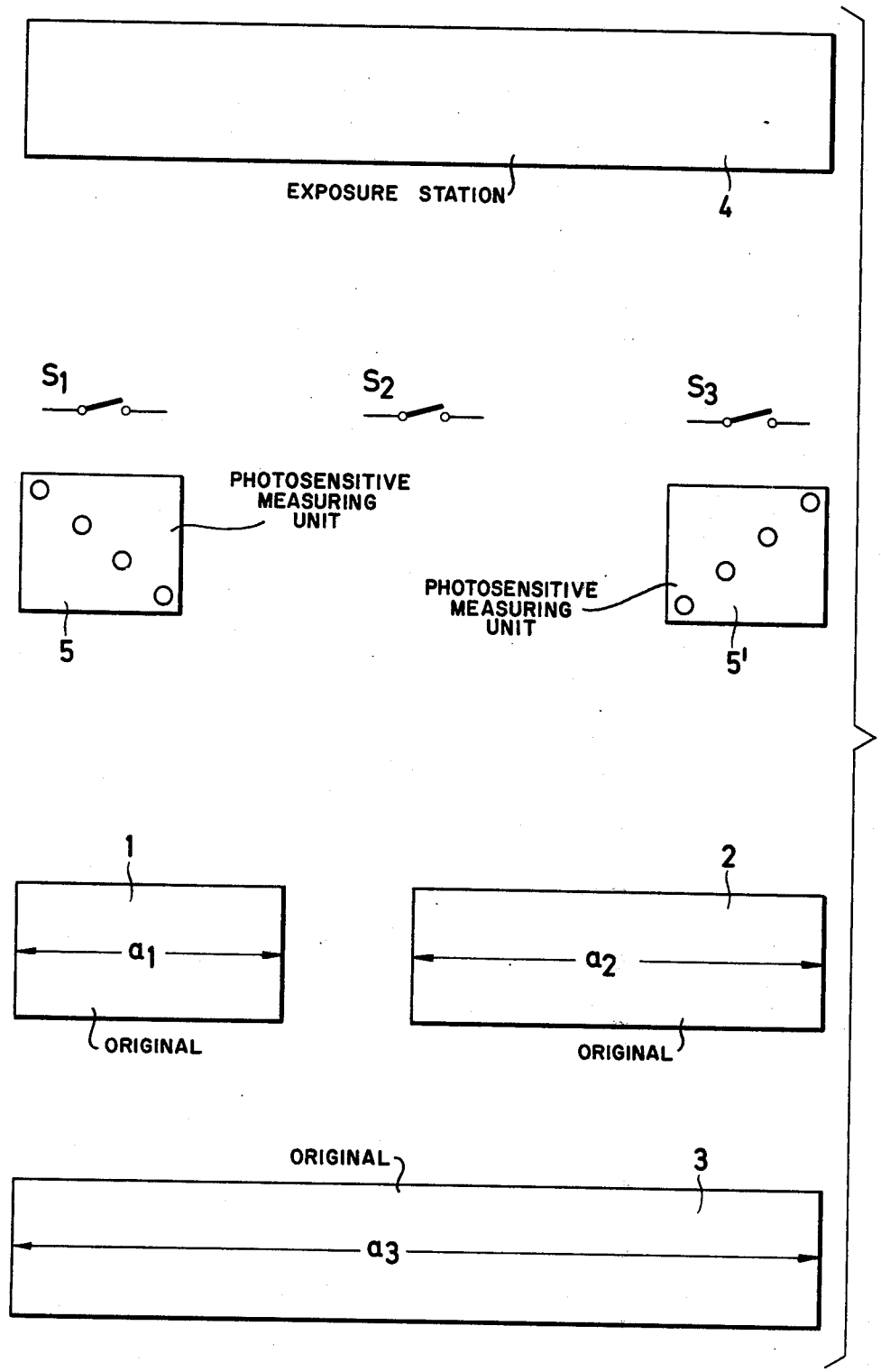

United States Patent [19]
Schröter et al.

[11] 3,879,125
[45] Apr. 22, 1975

[54] APPARATUS FOR AUTOMATICALLY CONTROLLING THE SPEED OF TRAVEL OF AN ORIGINAL AND OF COPYING MATERIAL IN A COPYING MACHINE

[75] Inventors: Herbert Schröter; Werner Dennhardt, both of Taunusstein, Germany

[73] Assignee: Kalle Aktiengesellschaft, Wiesbaden-Biebrich, Germany

[22] Filed: Dec. 26, 1973

[21] Appl. No.: 427,621

[30] Foreign Application Priority Data
Dec. 29, 1972 Germany............................ 2263952

[52] U.S. Cl. ...................... 355/68; 226/24; 355/83; 355/97
[51] Int. Cl. .......................................... G03b 27/46
[58] Field of Search ............. 355/68, 69, 50, 83, 97, 355/41; 226/29, 24

[56] References Cited
UNITED STATES PATENTS

| | | | |
|---|---|---|---|
| 3,248,029 | 4/1966 | Money | 226/29 |
| 3,349,684 | 10/1967 | Lode | 355/68 X |
| 3,588,247 | 6/1971 | Noda | 355/69 |
| 3,655,287 | 4/1972 | Brevers | 355/97 |
| 3,679,306 | 7/1972 | Du Bois et al. | 355/69 X |

*Primary Examiner*—Richard A. Wintercorn
*Attorney, Agent, or Firm*—James E. Bryan

[57] ABSTRACT

This invention relates to an improvement in an apparatus for automatically controlling the speed of travel of an original and of copying material in dependence upon the translucency of the original for use in a copying machine having at least one photosensitive measuring unit means in the path of travel of the original upstream of an exposure station for the measurement of the translucency of the original, a drive motor the speed of which is controllable through a signal derived from the photosensitive measuring unit means, and at least one switching element means in the path of travel of the original upstream of the exposure station, the improvement comprising time computer means, actuatable by said switching element means, which during a time computed by said computer means in dependence upon the speed of travel of the original, connects said photosensitive measuring unit means to storage means the potential of which serves for speed control of the drive motor, said switching element means being positioned immediately downstream of the photosensitive measuring unit means, and said switching element means being actuatable by the leading edge of the original.

10 Claims, 4 Drawing Figures

APPARATUS FOR AUTOMATICALLY CONTROLLING THE SPEED OF TRAVEL OF AN ORIGINAL AND OF COPYING MATERIAL IN A COPYING MACHINE

The present invention relates to an apparatus for automatically controlling the speed of travel of an original and of copying material in dependence on the translucency of the original for use in a copying machine. The translucency of the original is measured with a photosensitive measuring unit, the signals of which control the speed of the driving motor.

Since the translucency of different originals and the lightsensitivity of copying material fluctuate within wide limits, the speed of travel of an original and of copying material must be varied correspondingly in the zone of the exposure station. Since adjustment by the operator often leads to incorrect settings, a number of apparatuses have been developed in which the translucency of the originals is measured with the aid of a photosensitive measuring unit, and the speed of revolution of the driving motor is adjusted in accordance with the translucency measured (see German Gebrauchsmuster No. 1,977,688, German Auslegeschrift No. 1,522,790, German Offenlegungsschrift No. 2,119,373, and German Offenlegungsschrift No. 2,119,869).

With these apparatuses, as soon as the original covers the photosensitive measuring unit, the latter is connected with a storage which, in correspondence with the translucency measured, stores a signal and from which the signal is passed on for speed control. To ensure that the connection between the photosensitive measuring unit and the storage exists only when the original covers the photosensitive measuring unit, the apparatus of German Offenlegungsschrift No. 2,119,373 incorporates a switching element downstream of the photosensitive measuring unit in the path of travel of the original, which switching element, as soon as it is actuated by the leading edge of the original, connects the photosensitive measuring unit to the storage for a certain period of time. With this apparatus, time is so fixed that, with the highest speed of travel and the shortest size of the original, the original covers the photosensitive measuring unit during the measuring time. This means that, in the case of long originals and/or low speeds of travel, only a small portion of the original is used for measuring the translucency, i.e. there is the risk that, during the measuring time, a written part of the original happens to cover the photosensitive measuring unit and thus an incorrect translucency value is stored.

In order to reduce the probability of an incorrect transparency measurement, German Offenlegungsschrift No. 2,204,339 discloses an apparatus which has one switching element upstream and one downstream of the photosensitive measuring unit in the path of travel of the original. The photosensitive measuring unit is connected to the storage only as long as both switching elements are actuated by the original. In this apparatus, the duration of measurement is thus determined by the length of the original and the speed of travel concerned. For determining only the time for the translucency measurement, this apparatus requires at least two switching elements in the path of travel of the original. If several kinds of copying material are stored in the machine and several measuring units are located in the path of travel of the original, correspondingly more switching elements are required. The use of many switching elements in the path of travel of the original, however, is undesirable for the following reasons:

Mechanical switching elements have the disadvantage that they are relatively susceptible to malfunction. Using photoelectric switching elements instead of mechanical switching elements also encounters problems when the originals are conveyed by means of conveyor belts since these belts may be displaced laterally and thus cover the photoelectric switches. Therefore, the use of photoelectric switches is possible only at those places in the path of travel of the original at which there are no conveyor belts. It is thus desirable to employ as few switching elements as possible in the use of mechanical as well as in the use of photoelectric switching elements.

It is an object of the invention to employ as few switching elements as possible for translucency measurement and to utilize a larger part of the original for translucency measurement than has been possible with the apparatus of German Offenlegungsschrift No. 2,119,373.

In a further development of the invention, as in the apparatus of German Offenlegungsschrift No. 2,119,373, the translucency values of at least two originals are stored, the correct translucency value being interrogated shortly before the original passes into the exposure zone, without additional switching elements being required therefor, however.

The present invention provides an apparatus for automatically controlling the speed of travel of an original and of copying material in dependence upon the translucency of the original for use in a copying machine, which has at least one photosensitive measuring unit in the path of travel of the original upstream of the exposure station for the measurement of the translucency of the original and a driving motor the speed of which is controllable through the signal derived from the photosensitive measuring unit, and at least one switching element in the path of travel of the original upstream of the exposure station.

In the apparatus, the switching element is located immediately downstream of the photosensitive measuring unit and the switching element, when actuated by the leading edge of the original, starts a time computer which, during a time computed by it in dependence upon the speed of travel concerned, connects the photosensitive measuring unit for translucency measurement to a storage, the potential of which serves for speed control of the driving motor.

The present invention further relates to an apparatus in which the switching element is located upstream of the photosensitive measuring unit and the switching element, when actuated by the leading edge of the original, starts a time computer which computes a time in dependence upon the speed of travel concerned and the distance between the photosensitive measuring unit and the switching element, at the expiration of which time the time computer connects the photosensitive measuring unit for translucency measurement to a storage during a period of time again computed in dependence upon the speed of travel concerned, the potential of which storage serves for speed control of the driving motor.

The invention resides in using time computers instead of the hitherto used switching elements, which computers determine the times during which or after which functions are initiated which hitherto have been initiated by the switching elements.

The photosensitive measuring unit for measuring the translucency of the original preferably comprises a plurality of photosensitive elements which are relatively small in order to increase the likelihood of the translucency of any part of the original that carries no written matter being measured. For this reason, it is advantageous to so arrange the photosensitive elements that they are offset from each other in the direction parallel with and at right angles to the direction in which the original moves. If the photosensitive measuring unit comprises a plurality of photosensitive elements, then a discriminator is connected downstream of the photosensitive measuring unit, which discriminator seeks out from among the signals measured at the photosensitive elements that signal corresponding to the greatest translucency. Photoresistors, photoelectric cells, and the like can be used in known manner as the photosensitive elements.

If the originals are always introduced on the same guide strip of the feed table, one photosensitive measuring unit is sufficient. If, however, the originals are introduced on the right-hand or left-hand guide strip of the feed table, depending on their width, then there are two photosensitive measuring units.

Because of the susceptibility to malfunction of mechanical switches, the switching elements used in the path of travel of the original preferably are photoelectric switches (photoelements, etc.), which are used only at those places of the path travel of the original at which there are no conveyor belts. A machine with only one kind of copying material requires only one switching element in the path of travel of the original. In a machine in which a plurality of kinds of copying material with different properties are stored and in which the originals are always introduced on the same guide strip of the feed table, a switching element is required for each kind of copying material, when that element simultaneously has the function to select the correct kind of copying material in correspondence with the width of the original. In the case of three kinds of copying material, three switching elements are required. If, however, the originals are introduced on the right-hand or left-hand guide strip of the feed table, depending on their width, two switching elements are sufficient for a machine with three kinds of copying material.

In accordance with the invention, the switching element or elements may be located either immediately downstream of the photosensitive measuring unit path the pth of travel of the original or at any place upstream of the photosensitive measuring unit. In both cases, the time computer has the function to connect the photosensitive measuring unit to the storage during a time computed in dependence upon the speed of travel concerned. If the switching element is immediately downstream of the photosensitive measuring unit, connection is established immediately upon the actuation through the leading edge of the original. If the switching element is upstream of the photosensitive measuring unit, the time computer, upon actuation by the leading edge of the original, first computes a time upon the expiration of which is connects the photosensitive measuring unit to the storage. The time is computed in dependence on the speed of travel concerned and on the distance between the switching element and the photosensitive measuring unit. Only after the expiration of that time, is it ensured that the original covers the photosensitive measuring unit, and only then the latter may be connected to the storage for translucency measurement. The time for translucency measurement is computed in both cases by the time computer in dependence upon the speed of travel concerned.

Mechanical or electronic time computers may be used, the latter being preferred. As soon as the leading edge of the original actuates the switching element, a saw-tooth generator is started in the electronic time computer, the potential of which generator increases proportionately with time. The increase is proportional to the tacho-generator potential concerned and thus proportional to the speed of travel, i.e., in the case of a high speed of travel, the saw-tooth potential rises steeply with time, in the case of a lower speed of travel, correspondingly less steeply. The saw-tooth potential is compared to a given potential; as soon as both potentials are identical the time computer emits a pulse which, for example, breaks the connection between the photosensitive measuring unit and the storage, starts a second time computation or initiates the interrogation of the stored signal of an original, as it is further illustrated below. The value of the given potential, inter alia, depends, for example, on the distance between the switching element and a certain point at which, as soon as the original has reached it, a certain function is to be performed.

The apparatus is particularly suitable for copying machines in which the translucency values of at least two originals can be stored and the translucency value of an original is interrogated as soon as it has reached the exposure station. With these copying machines, it is not necessary to wait until an original has passed the exposure station before a new original can be introduced into the copying machine. As with the apparatus of German Offenlegungsschrift No. 2,119,373, a storage with a plurality of capacitors is available for this purpose as well as a step-by-step switching system through which the photosensitive measuring unit is connected to one of the capacitors of the storage. Furthermore, there is a second step-by-step switching system through which one of the capacitors, i.e. that which stores the signal of the original just passing into the exposure station, is connected to an amplifier from which the signal is passed on for speed control of the driving motor. Simultaneously, the signal of the preceding original is cancelled through the second step-by-step switching system in that the corresponding capacitor is discharged through a resistor. In the apparatus of German Offenlegungsschrift No. 2,119,373, separate switching elements for interrogation and cancellation are located in the path of travel in the original.

As mentioned above, it is desirable to keep the number of the mechanical as well as the photoelectric switching elements as small as possible. Therefore, in accordance with the invention, actuation of the same switching element by the leading edge of the original starts not only the time computer for translucency measurement but also a second time computer which computes a time in dependence on the distance between the switching element and the exposure station, at the expiration of which time the second step-by-step switching system is actuated for the interrogation of the signal of the corresponding original as well as for the cancellation of the signal of the preceding original.

If the distance between the switching element and the exposure station is very small, one time computer for interrogation is sufficient. In the case of a larger distance between the switching element and the exposure station, it is advantageous to have two computers for interrogation which alternately compute the times for two successive originals. With only one time computer in the just described case, the new original would reach the switching element only when the preceding original had already reached the exposure station.

Since, in copying machines, types of copying material with different light-sensitivities are used, it is advantageous to also consider the light-sensitivity concerned for the speed of travel in order to obtain good copies. Therefore, in a preferred embodiment, a plurality of, but at least two, amplifiers are provided which amplify the signal deriving from the storage in correspondence with the lightsensitivity of the type of copying material used before it is used for speed control. If a plurality of types of copying material are stored in the copying machine to be selected by the original, a preselector switch to be connected into the control circuit is coordinated to each type of copying material, by means of which one of the capacitors can be preselected for the type of copying material, and switching elements in the path of the original are coordinated to the types of copying material, by means of which, upon actuation through the original, the preselector switch coordinated to the selected type of copying material and thus the amplifier selected thereby are connected into the control circuit. In the apparatus of the invention, these switching elements are identical with those starting the time computer for translucency measurement, as well as the time computer for interrogation and cancellation.

When the types of copying material in the copying machine are not stored in the form of sheets but in the form of endless webs, these switching elements simultaneously also can take over the function of drawing copying material from the roll and cutting it, in dependence on the length of the original measured by them.

In the apparatus of the invention, it is of course possible to switch the motor to a pre-set idling speed when an original has left the exposure station and the translucency value of the successive original is not yet interrogated.

Figure 2:
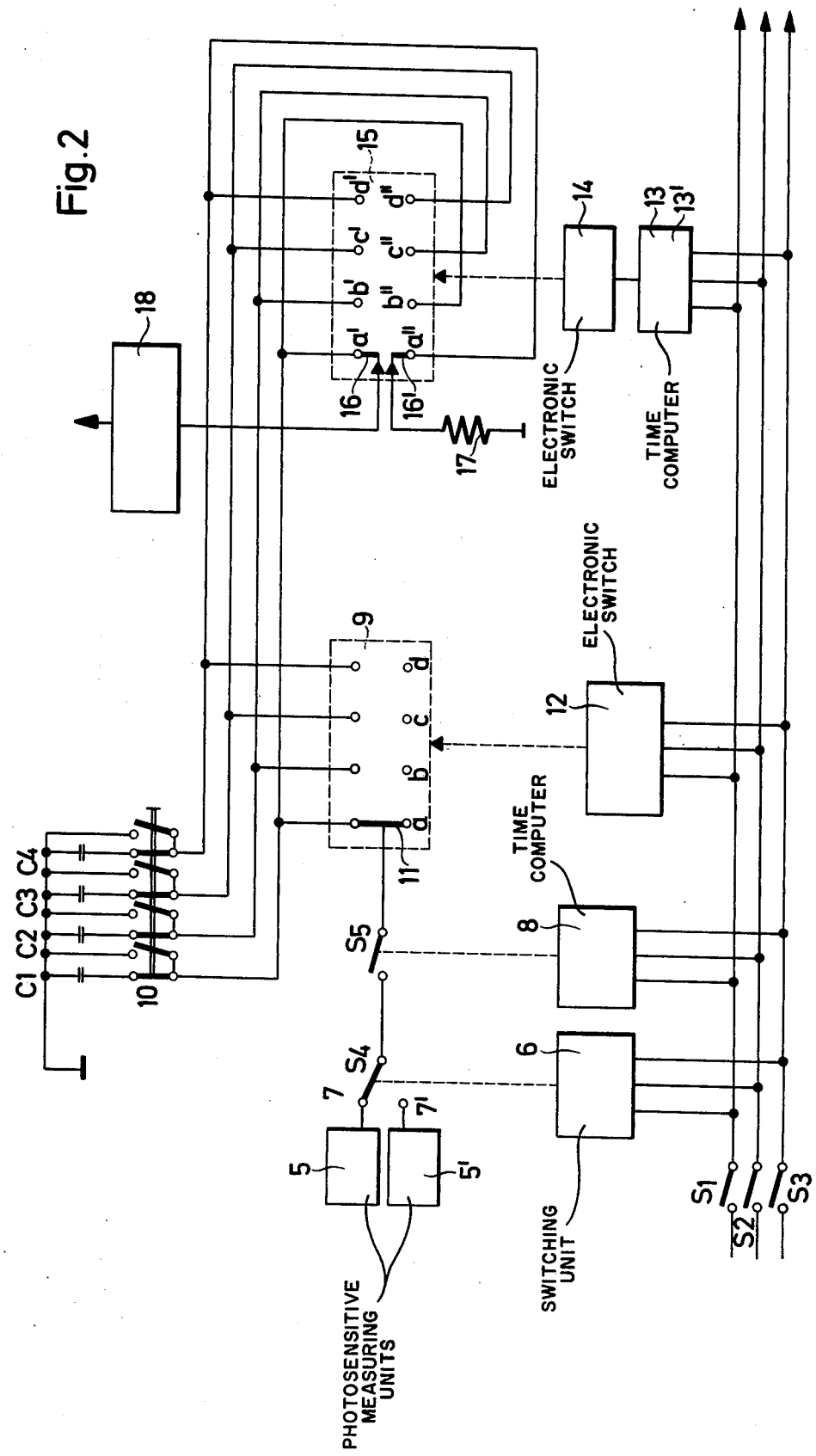
Figure 3:
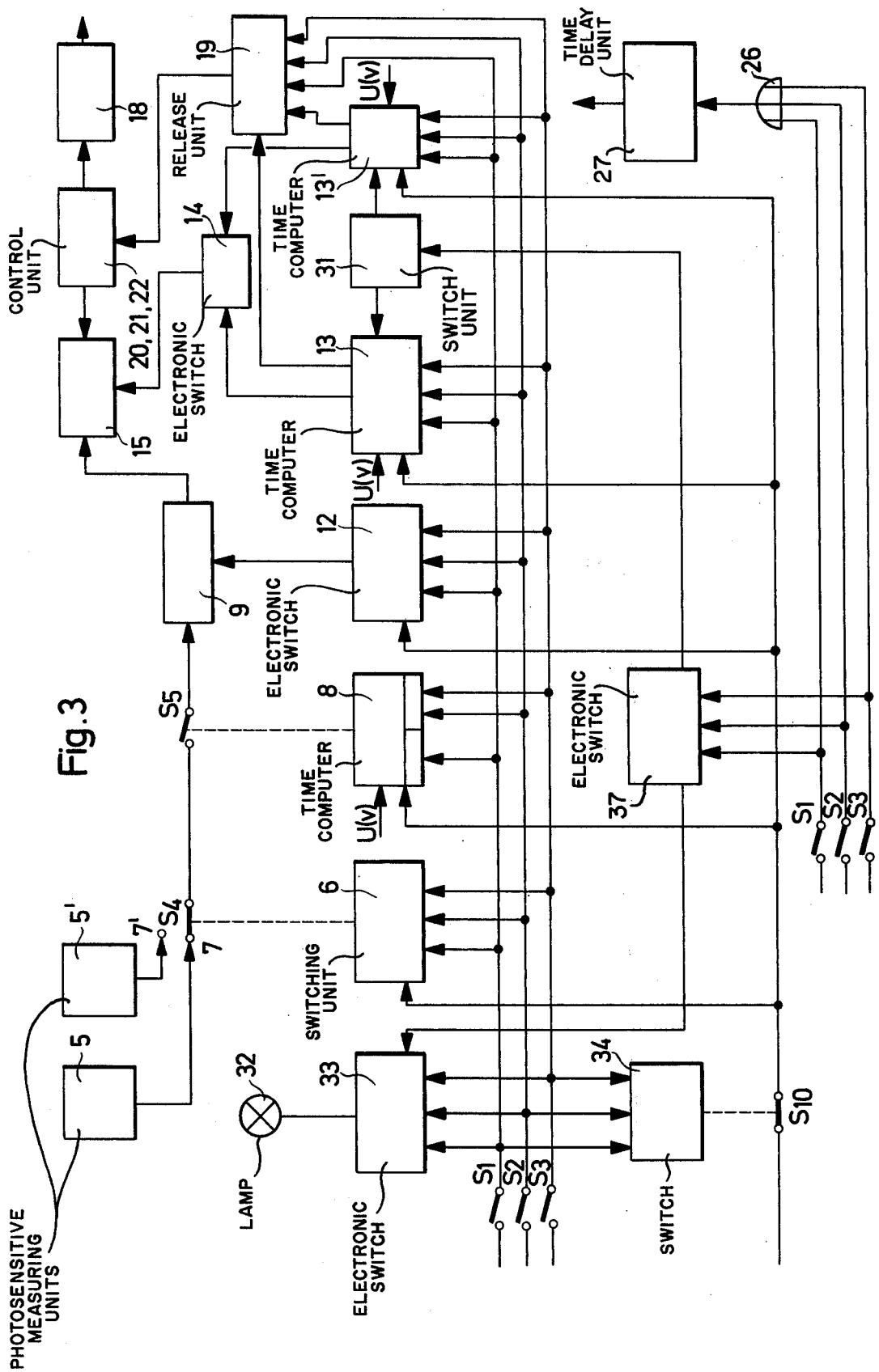
Figure 4:
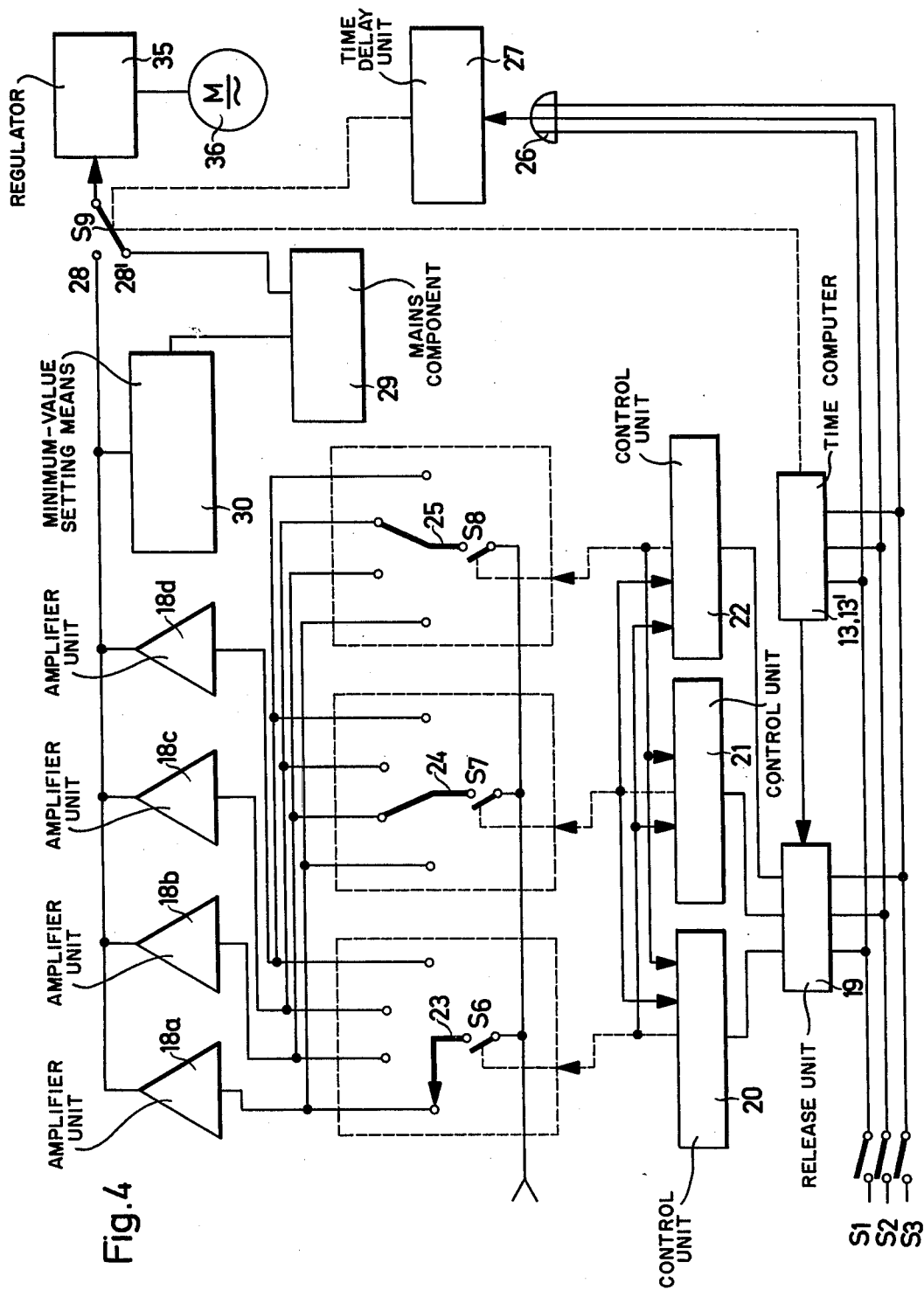

The invention will now be further illustrated by way of an exemplary embodiment and the accompanying drawings, in which:

FIG. 1 is a diagrammatic plan view of the path of travel of originals upstream of a copying station (the size of the original and the distances are not drawn to scale), FIG. 2 is a detailed circuit diagram for the control device between the photosensitive measuring units and the amplifier unit, FIG. 3 is a block circuit diagram of the control device, and FIG. 4 is a detailed circuit diagram of the amplifier unit.

In the copying machine, three rolls of copying material are stored (not shown in the drawings) which differ in their widths and possibly other properties, e.g. lightsensitivity. Switching elements in the path of travel of the original are coordinated to the rolls of copying material and, depending upon the width of the original introduced, one of the three types of copying material is selected. An original 1 of the width $a_1$ is introduced along the left-hand guide strip (not shown in FIG. 1) of the feed table, an original 2 of the width $a_2$ along the right-hand guide strip, and an original 3 of the width $a_3$ optionally on the left-hand or right-hand side.

When an original 1 of the width $a_1$ is introduced into the machine, it actuates the switching element $S_1$ on its way to the exposure station 4 and the roll with the smallest width is selected. The original 2 of the width $a_2$ actuates the switching element $S_3$ and the roll of medium width is selected. The original 3 of the width $a_3$ actuates the switching elements $S_1$, $S_2$, and $S_3$. Since the switching element $S_2$ is coordinated to the roll of the largest width, this roll is selected. As soon as the switching element $S_2$ is actuated through the leading edge of an original, the functions initiated by the switching elements $S_1$ and $S_3$ are not performed.

In this apparatus, the switching element $S_2$ can be omitted if all functions related to the widest original 3 are initiated when $S_1$ and $S_3$ are actuated while, when only $S_1$ or $S_3$ is actuated, only those functions are initiated which are related to original 1 or original 2, respectively.

On its way to the exposure station 4, an original 1, 2 or 3 passes at least one of the photosensitive measuring units 5 and 5' each comprising a plurality of photosensitive elements. At this point, the original 1, 2 or 3 is irradiated by light of the copying light source which impinges on the photosensitive elements of the measuring unit 5 or 5', which measure the translucency of the original 1, 2 or 3.

When the switching elements $S_1$, $S_2$ and/or $S_3$ are actuated by the leading edge of the original, simultaneously a number of functions are initiated which will be described in the following.

1. Depending on which switching element or elements $S_1$, $S_2$ and $S_3$ is or are actuated by the leading edge of the original, the translucency is measured by the photosensitive measuring unit 5 or 5'. The photosensitive measuring unit 5 measures the translucency of originals of the width $a_1$ since, as soon as only the switching element $S_1$ is actuated by an original, the switch $S_4$ closes to the contact 7 through a switch unit 6. When the switches $S_2$ and/or $S_3$ are actuated by originals, the switch $S_4$ closes to the contact 7' through the switch unit 6 so that the translucency of originals of the widths $a_2$ and $a_3$ is measured by the photosensitive measuring unit 5'.

2. The time computer 8 is started which closes the switch $S_5$ and opens it only at the expiration of the time computed by it in dependence on the present speed of travel. Whereas the switch $S_5$ is closed, the photosensitive measuring unit 5 or 5' is connected through the step-by-step switching system to one of the capacitors $C_1$ to $C_4$ of the storage 10. In the circuit diagram shown in FIG. 2, the capacitor $C_1$ is charged in correspondence with the translucency measured in the photosensitive measuring unit 5 or 5' as long as $S_5$ is closed, since the contact wiper 11 of the step-by-step switching system 9 bears on the contact pair $a$.

3. By way of an electronic switch 12, a brief electrical pulse is released which causes the contact wiper 11 in the first step-by-step switching system 9 to move to an extent equal to a switching period to an adjacent pair of contacts $a$, $b$, $c$ or $d$ and thus selects the next capacitor.

4. One of the time computers 13 or 13' is started (for simplification, FIGS. 2 and 4 contain only one time computer) which computes a time in dependence upon the distance between the switching elements $S_1$, $S_2$ or $S_3$ and the exposure station 4 and in dependence upon the present speed of travel, after the lapse of which time a brief electrical pulse is released by way of the electronic switch 14, which pulse causes the contact wipers 16 and 16' in the second step-by-step switching system 15 to move to an extent equal to a switching period to an adjacent pair of contacts $a'$, $b'$, $c'$ or $d'$ and $a''$, $b''$, $c''$ or $d''$. By the movement of the contact wiper 16, the next capacitor is selected for interrogation of the signal stored therein and by the movement of the contact wiper 16', the signal in the preceding capacitor is cancelled through the resistor 17. In the circuit diagram shown in FIG. 2, the signal stored in capacitor $C_1$ is interrogated, i.e. the signal is passed on through the amplifier unit 18 and a regulator 35 for speed control of the driving motor 36. Since the contact wiper 16' bears against contact $a''$, the signal in the preceding capacitor, in this case $C_4$, is simultaneously cancelled through the resistor 17.

5. A pulse is emitted to the release unit 19 which, at the expiration of the time computed by the time computer for interrogation 13 or 13', actuates one of the control units 20, 21 or 22. The following describes how the switching elements $S_1$, $S_2$ and $S_3$ thereby take over the function whereby that amplifier 18a, 18b, 18c or 18d is connected into the control circuit which corresponds to the light-sensitivity of the roll of copying material selected by the original. A preselector switch is coordinated to each roll of copying material, preselector switch 23 to the roll of the smallest width, preselector switch 25 to the roll of medium width, and preselector switch 24 to the roll of the largest width. When a roll is introduced into the copying machine, in correspondence with its light-sensitivity, one of the amplifiers 18a, 18b, 18c and 18d is preselected manually by means of the preselector switch coordinated to that roll. In FIG. 4, for example, amplifier 18a is preselected for the roll of the smallest width, amplifier 18c for the roll of medium width, and amplifier 18b for the roll of the largest width. Furthermore, a control unit and a switch in the control circuit is coordinated to each type of copying material or each switching element coordinated to it, control unit 20 and switch $S_6$ are coordinated to the roll of the smallest width and to the switching element $S_1$, control unit 22 and switch $S_8$ to the roll of medium width and to the switching element $S_3$, and control unit 21 and switch $S_7$ to the roll of the largest width and to the switching element $S_2$.

When a switching element is actuated by the leading edge of the original, after the time computed by the time computer 13 or 13', a pulse, as described above, is passed from the release unit 19 to that control unit which is coordinated to the switching element actuated by the original. The control unit 20, 21 or 22 closes the switch $S_6$, $S_7$ or $S_8$, respectively, coordinated to it and sends blocking signals to the two other control units not selected. By the closing of $S_6$, $S_7$ or $S_8$, the signal interrogated from the storage 10 is passed through the amplifier corresponding to the light-sensitivity of the selected roll through a regulator 35 to the driving motor 36.

6. A pulse is sent through an OR gate 26 to the time delay unit 27, whereby, after the expiration of the time computed by the time computer 13 or 13', switch $S_9$ closes to the contact 28. Connection between the storage 10 through an amplifier to the regulator 35 is then established. When the trailing edge of the original clears the switching elements $S_1$, $S_2$ and $S_3$, the time delay unit 27 causes a delay period at the expiration of which the switch $S_9$ closes to the contact 28' so that the regulator component is connected to the mains componen 29. The voltage applied to the regulator 35 can be pre-set and advantageously so selected that the driving motor 36 turns at its highest speed.

The minimum-value setting means 30 provides that a minimum voltage is applied to the regulator 35 when $S_9$ bears against contact 28. The minimum voltage corresponds to the lowest speed at which the driving motor 36 is able to turn. When an original is introduced the translucency of which yields a voltage value below the minimum voltage, the driving motor 36 would stop. This is prevented by the minimum-value setting means 30 which yields the necessary minimum voltage.

When the switching elements $S_1$, $S_2$ and/or $S_3$ are cleared by the trailing edge of the original, the next time computer 13 or 13' is prepared for starting through a switch unit 31.

As can be seen from FIG. 3, there is a lamp 32 which indicates when the next original can be introduced into the copying machine. It is switched off by way of an electronic switch 33 when a leading edge of an original reaches one of the switching elements $S_1$, $S_2$ and $S_3$, and it is switched on again when a trailing edge of an original again clears the switching element or elements.

Furthermore, actuation of one of the switching elements $S_1$, $S_2$, or $S_3$ by a leading edge of an original results in the cancellation of a blocking pulse in that the switch $S_{10}$ is opened by way of the switch 34. After the clearing of the switching elements $S_1$, $S_2$, and $S_3$ by the trailing edge of the original, it is again closed so that a blocking voltage is applied to the function units shown in FIG. 3. It prevents that the initial positions of the function units are interfered with by interference pulses.

When an original of the width $a_2$ is introduced into the copying machine along the right-hand guide strip, as soon as its leading edge reaches the switching element $S_3$, the functions individually listed under points 1 to 6 are initiated, furthermore the lamp 32 is switched off and the blocking voltage is cancelled. The contact wiper 11 of the step-by-step switching system 9 is placed against the contact pair $b$, and the switch $S_5$ is closed during the time computed by the time computer 8.

Since simultaneously, through the switching unit 6, the switch $S_4$ has closed to the contact 7', the translucency value of the original 2 measured by the photosensitive measuring unit 5' is stored in the capacitor $C_2$ of the storage 10. During the time computed by the time computer 8, the photosensitive measuring unit 5' is covered by the original 2. At the expiration of the period, the switch $S_5$ is again opened.

Simultaneously, when the leading edge of the original 2 actuates the switching element $S_3$, the time computer 13 is started for interrogation. At the expiration of the time computed by it, the contact wipers 16 and 16' in the step-by-step switching system 15 are closed to the next contact $b'$ or $b''$, respectively. By the closing of the contact wiper 16', the capacitor $C_1$ which has stored the signal of the preceding original is discharged through the resistor 17. Furthermore, at the expiration of the time computed by the time computer 13, the control unit 22 is actuated through the release unit 19, whereby the switch $S_8$ is closed and the switches $S_6$ and $S_7$, if they have been closed, are opened. Furthermore, the switch $S_9$ is closed to the contact 28 after the expiration of the time computed by the time computer. By the above-mentioned closing of the contact wiper 16 in the step-by-step switching system 15 to the contact $b$, the voltage of the capacitor $C_2$ which has stored the signal of the original 2 is amplified through the closed switch $S_8$ at the amplifier 18$c$ and, through the switch $S_9$ bearing against the contact 28, applied to the regulator 35 for speed control of the driving motor 36. The signal deriving from the capacitor $C_2$ is amplified by the amplifer 18$c$ since the latter has been preselected by the preselector switch 25 for the light-sensitivity of the roll of medium width. Since the time computed by the time computer 13 expires shortly before the original 2 has entered the exposure station 4, the driving motor 36, when the original 2 and the copying material enter the exposure station 4, runs at the speed of travel corresponding to the translucency of the original 2 and the light-sensitivity of the roll of medium width.

Upon the passage of the trailing edge of the original 2, voltage is again applied to the lamp 32 through the electronic switch 37 for trailing edge control, i.e. the lamp indicates that the machine is prepared for the introduction of a fresh original.

Simultaneously, through the electronic switch 37 for the trailing edge control, the switch unit 31 is actuated so that the time computer 13' for the computation of the time for the next original is made available and, after a time delay caused by the delay unit 27, the switch $S_9$ is again closed to the contact 28' so that the voltage of the mains component 29 is at the regulator 35 and the driving motor 36 runs at an idling speed corresponding to this voltage.

The times computed by the time computers 8, 13, and 13' are computed in dependence upon the speed of travel concerned.

If, after the clearing of the switching element $S_3$ by the trailing edge of the original 2, no fresh original is introduced, after a certin time delay, the switch $S_{10}$ is closed again so that a blocking voltage is applied to the function units.

It will be obvious to those skilled in the art that many modifications may be made within the scope of the present invention without departing from the spirit thereof, and the invention includes all such modifications.

What is claimed is:

1. In an apparatus for automatically controlling the speed of travel of an original and of copying material in dependence upon the translucency of the original for use in a copying machine having at least one photosensitive measuring unit means in the path of travel of the original upstream of an exposure station for the measurement of the translucency of the original, a drive motor the speed of which is controllable through a signal derived from the photosensitive measuring unit means, and at least one switching element means in the path of travel of the original upstream of the exposure station, the improvement which comprises time computer means, actuatable by said switching element means, which during a time computed by said computer means in dependence upon the speed of travel of the original, connects said photosensitive measuring unit means to storage means the potential of which serves for speed control of the drive motor, said switching element means being positioned immediately downstream of the photosensitive measuring unit means, and said switching element means being actuatable by the leading edge of the original.

2. An apparatus according to claim 1 in which, for the storage of the signals of at least two originals and for the interrogation of the signal related to an orginal, shortly before the original reaches the exposure station, said switching element means, when actuated by the leading edge of the original furthermore a. actuates a first step-by-step switching system means through which, during translucency measurement, said photosensitive measuring unit means is connected to said storage means and b. actuates a time computer means for interrogation which, upon the expiration of the time computed by it in dependence upon the speed of travel of the original and the distance between said switching element means and the exposure station, actuates a second step-by-step switching system means, whereby the stored signal of the original is passed on through an amplifier means for speed control of the drive motor and the stored signal of the preceding original is cancelled.

3. An apparatus according to claim 2 including two time computer means for interrogation, whereby times are computed alternately for successive originals and, when said switching element means is cleared by the trailing edge of an original, one time computer is available for the next original.

4. An apparatus according to claim 1 including at least two amplifier means provided to suit the light-sensitivity of the copying material, and means for connecting said amplifier means into a control circuit for the apparatus.

5. An apparatus according to claim 4 including at least two types of copying material to be selected by the original, preselector switch means adapted to be connected into the control circuit and coordinated to each type of copying material, whereby capacitor means can be preselected for the type of copying material, and said switching element means in the path of travel of the original being coordinated to each type of copying material, whereby upon actuation through the original said preselector switch means coordinated to the selected type of copying material and thus the amplifier means selected thereby, are connected into said control circuit.

6. In an apparatus for automatically controlling the speed of travel of an original and of copying material in dependence upon the translucency of the original for use in a copying machine having at least one photosensitive measuring unit means in the path of travel of the original upstream of an exposure station for the measurement of the translucency of the original, a drive motor the speed of which is controllable through a signal derived from the photosensitive measuring unit means, and at least one switching element means in the path of travel of the original upstream of the exposure station, the improvement which comprises time computer means, actuatable by said switching element means, which computes a time in dependence upon the speed of travel of the original and the distance between said photosensitive measuring unit means and said switching element means, said time computer means at the expiration of said time connecting said photosensitive measuring unit means to storage means during a period of time again computed in dependence upon the speed of travel of the original, the potential of which storage means serves for speed control of the drive motor, and said switching element means being positioned upstream of the photosensitive measuring unit means, and said switching element means being actuatable by the leading edge of the original.

7. An apparatus according to claim 6 in which, for the storage of the signals of at least two originals and for the interrogation of the signal related to an original, shortly before the original reaches the exposure station, said switching element means, when actuated by the leading edge of the original furthermore
   a. actuates a first step-by-step switching system means through which, during translucency measurement, said photosensitive measuring unit means is connected to said storage means and
   b. actuates a time computer means for interrogation which, upon the expiration of the time computed by it in dependence upon the speed of travel of the original and the distance between said switching element means and the exposure station, actuates a second step-by-step switching system means, whereby the stored signal of the original is passed on through an amplifier means for speed control of the drive motor and the stored signal of the preceding original is cancelled.

8. An apparatus according to claim 7 including two time computer means for interrogation, whereby times are computed alternately for successive originals and, when said switching element means is cleared by the trailing edge of an original, one time computer is available for the next original.

9. An apparatus according to claim 6 including at least two amplifier means provided to suit the light-sensitivity of the copying material, and means for connecting said amplifier means into a control circuit for the apparatus.

10. An apparatus according to claim 9 including at least two types of copying material to be selected by the original, preselector switch means adapted to be connected into the control circuit and coordinated to each type of copying material, whereby capacitor means can be preselected for the type of copying material, and said switching element means in the path of travel of the original being coordinated to each type of copying material, whereby upon actuation through the original said preselector switch means coordinated to the selected type of copying material and thus the amplifier means selected thereby, are connected into said control circuit.

* * * * *